United States Patent
Sprangle

(10) Patent No.: US 8,933,946 B2
(45) Date of Patent: Jan. 13, 2015

(54) MECHANISM FOR EFFECTIVELY HANDLING TEXTURE SAMPLING

(75) Inventor: Eric Sprangle, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1072 days.

(21) Appl. No.: 11/967,408

(22) Filed: Dec. 31, 2007

(65) Prior Publication Data
US 2009/0174721 A1 Jul. 9, 2009

(51) Int. Cl.
| | | |
|---|---|---|
| *G06T 1/00* | (2006.01) | |
| *G06T 15/00* | (2011.01) | |
| *G09G 5/00* | (2006.01) | |
| *G06F 9/45* | (2006.01) | |
| *G06T 15/04* | (2011.01) | |
| *G09G 5/02* | (2006.01) | |

(52) U.S. Cl.
CPC .. *G09G 5/00* (2013.01); *G06F 8/41* (2013.01); *G06T 15/005* (2013.01); *G06T 15/04* (2013.01); *G06T 2200/28* (2013.01); *G09G 5/026* (2013.01); *G09G 2340/10* (2013.01); *G09G 2360/121* (2013.01)
USPC .......................................... 345/522; 345/582

(58) Field of Classification Search
CPC ............................ G06T 1/20; G06F 8/41–8/49
USPC ................................... 345/522; 717/140–161
See application file for complete search history.

(56) References Cited

U.S. PATENT DOCUMENTS

| | | | | |
|---|---|---|---|---|
| 6,288,730 | B1 * | 9/2001 | Duluk et al. ................... | 345/552 |
| 6,954,566 | B2 | 10/2005 | Johannessen | |
| 7,050,063 | B1 | 5/2006 | Mantor | |
| 7,075,548 | B1 | 7/2006 | Poddar | |
| 7,542,043 | B1 * | 6/2009 | Lindholm et al. ............. | 345/506 |
| 2004/0189650 | A1 * | 9/2004 | Deering ......................... | 345/506 |
| 2007/0002066 | A1 * | 1/2007 | Whitted et al. ................ | 345/582 |
| 2007/0182750 | A1 * | 8/2007 | Teruyama et al. ............. | 345/558 |
| 2008/0074433 | A1 * | 3/2008 | Jiao et al. ....................... | 345/522 |

* cited by examiner

*Primary Examiner* — Aaron M Richer
(74) *Attorney, Agent, or Firm* — Trop, Pruner & Hu, P.C.

(57) ABSTRACT

A method and apparatus for efficiently handling texture sampling is described herein. A compiler or other software is capable of breaking a texture sampling operation for a pixel into a pre-fetch operation and a use operation. A processing element, in response to executing the pre-fetch operation, delegates computation of the texture sample of the pixel to a hardware texture sample unit. In parallel to the hardware texture sample unit performing a texture sample for the pixel and providing the result, i.e. a textured pixel (texel), to a destination address, the processing element is capable of executing other independent code. After an amount of time, the processing element executes the use operation, such as a load operation to load the texel from the destination address.

23 Claims, 4 Drawing Sheets

MECHANISM FOR EFFECTIVELY HANDLING TEXTURE SAMPLING

FIELD

This invention relates to the field of media execution and, in particular, to efficient texture sampling execution.

BACKGROUND

As computer systems evolve into media centers in households, the computer systems are tasked with greater media processing workloads. Previously, add-in graphics cards and physics accelerators have been included to aid in the graphics processing. In addition, host processors are also being designed to more efficiently execute graphics applications.

A very common graphics calculation includes sampling a texture. Texture sampling often refers to determining a texture color for a texture mapped pixel, by interpolating the colors of nearby pixels of textures (texels). As an example, an average of two texels around a target texel are averaged to determine the target texel. However, the interpolation process often consumes a large number of execution cycles. As a result, a processor pipeline computing the texture sample may stall, which results in an expensive cost in execution cycles. In the alternative, more hardware threads may be included on a processor to execute other software threads to mask the stall; however, even on a processor with multiple hardware threads is still impacted by stalls associated with texture sampling. Furthermore, the cost of replicating hardware threads on a processor becomes expensive to mask an inefficient method of handling texture sampling.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific types of processor cores, specific time periods, specific memory locations, specific examples of independent software work to be executed, etc. in order to provide a thorough understanding of the present invention. It will be apparent, however, to one skilled in the art that these specific details need not be employed to practice the present invention. In other instances, well known components or methods, such as specific compiler algorithms and implementations for identifying and compiling texture sample operations, specific logic included in a hardware texture unit to perform texture samples, details of performing texture samples and shading, and other specific operational details, have not been described in detail in order to avoid unnecessarily obscuring the present invention.

The method and apparatus described herein are for efficiently handling texture sampling. Specifically, efficient texture sampling discussed in reference to a host processor including a hardware texture sampling unit. However, the methods and apparatus for efficiently handling texture sampling are not so limited, as they may be implemented on or in association with any known processing device capable of performing a texture sample, such as a graphic processor or graphics add-in card, as well as with any hardware capable of performing a texture sample whether included in the processor, or external thereto. In addition, the methods and apparatus for efficient texture sampling may be applied to other long latency processing tasks, not just to texture sampling.

Figure 1:
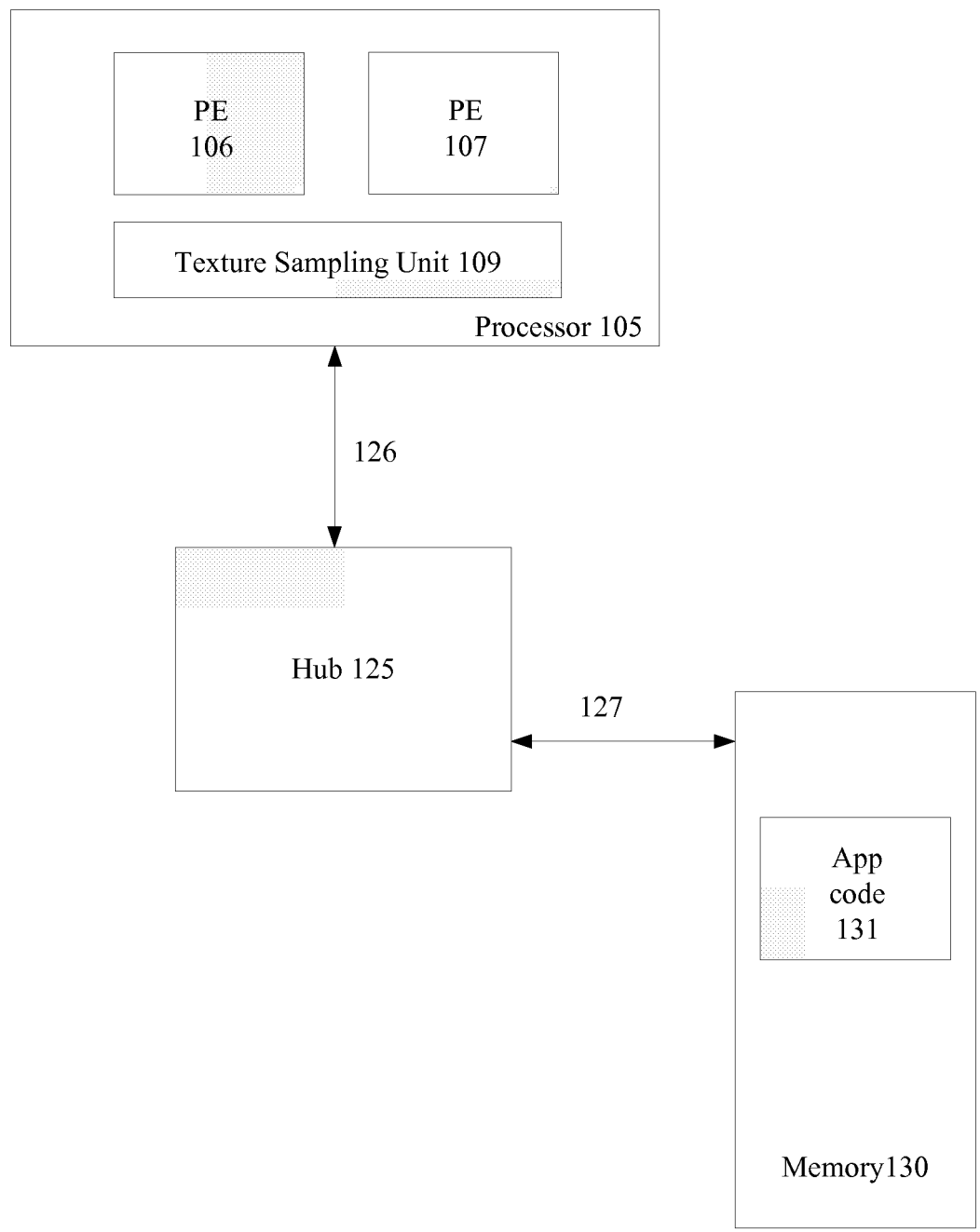
FIG. 1 illustrates an embodiment of a computer system including a processor having hardware texture sampling logic for effectively handling texture sampling operations.

Referring to FIG. 1, an embodiment of a computer system including a hardware texture sampling unit in a processor to efficiently handle texture sampling operations is illustrated. A portion of a traditional multi-processor system architecture is depicted. However, the efficient handling of texture sampling described herein may be utilized in any system, such as single processor computer systems, servers, embedded systems, mobile systems, media systems and other systems having to perform texture samples. As an example, efficient handling of texture sampling, as described herein, is implemented in a media processor system targeted at high performance host processor graphics/media processing. Yet, processor 105 may include any processor, such as a graphics processor.

Memory 130, as illustrated in FIG. 1 includes a system memory, to hold code, data, and other information to be accessed during runtime. As an example, memory 130 holds application code 131. Application code 131, in one embodiment, includes texture sampling operations compiled into pre-fetch texture sample operations, when executed, to aid in delegation of texture sampling computations to hardware texture sampling unit 109. An example of system memory includes dynamic random access memory (DRAM). However, any memory may be utilized for system memory, such as double data rate (DDR) memory, synchronous dynamic RAM (SDRAM), buffered memory, and other known memory devices. Additionally, memory 130 is not limited to a system memory, and may include other known memory devices, such as a flash memory device.

In one embodiment, hub 125 resembles a chipset. Often a chipset comprises two integrated circuit devices, such as a memory controller hub (MCH) and an interconnect controller hub (ICH). However, hub 125 may include any integrated circuit for facilitating communication between processors and other system devices. Often, Input/Output (I/O) devices are coupled to the ICH. Examples of I/O devices include CDROMs, DVD players, network interface cards, graphics cards, audio cards, and other I/O devices.

Interconnect 126, as illustrated, couples processor 105 to hub 125. Often interconnect 126 is referred to as a Front Side Bus (FSB). Physically, interconnect 126 may utilize a parallel bus, a serial bus, a multi-drop bus, a point-to-point bus, a Gunning Transceiver Logic (GTL) bus, a GTL+ bus, a double data rate (DDR) bus, a differential bus, or other known physical layer/implementation of an interconnect. As a specific illustrative embodiment, interconnect 126 includes a high speed serial point-to-point interconnect, which substantially attempts to adhere to Intel's Quickpath cache coherent specification.

Processor 105 is often referred to as a physical processor, but may include any style of processor device, such as a microprocessor, an embedded processor, a multi-core processor, a multi-threaded processor, a graphics processor, a media processor or a signal processor. As discussed in the example above, processor, in one embodiment, includes a media processor including a hardware texture sampling unit. In one embodiment, processor 105 includes multiple processing elements, such as processing elements 106 and 107.

A processing element refers to a thread, a process, a context, a logical processor, a hardware thread, a core, and/or any processing element, which utilizes resources of the processor, such as reservation units, execution units, pipelines, and/or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads.

Therefore, a processing element includes any of the aforementioned elements capable of maintaining a context, such as cores, threads, hardware threads, virtual machines, or other resources. Processor 100 may include asymmetric cores, i.e. cores with different configurations, functional units, and/or logic. Alternatively, cores of processor 105 may include symmetric cores capable of executing different application in parallel. For example, processor 105 may include three cores, such as processing element (PE) 106 to execute code, PE 107 also to execute code, and PE 109, which is utilized as a hardware texture sampling unit. In contrast, logic in processor 105 includes hardware sampling logic.

As an illustrative example, software, such as a compiler, when compiling application code to form an executable binary image, such as application code 131, is to determine texture sample operations and compile them to enable texture sampling delegation. Texture sampling often refers to determining a texture color for a texture mapped pixel, by interpolating the colors of nearby pixels of textures (texels). As an example, an average of two texels around a target texel are averaged to determine the target texel. However, generally, texture sampling may include determining any characteristic of a pixel through interpolation of nearby pixels.

As an example, a texture sample operation referencing a pixel in language code is compiled into a pre-fetch texture sample operation. The pre-fetch texture sample operation, when executed by PE 106, is to provide coordinates of the pixel and a destination address to texture sampling unit 109. Texture sampling unit 109 includes logic for texture sampling the pixel. In parallel to texture sampling unit 109 texture sampling the pixel, PE 106 is capable of executing other independent portions of application code 131. Therefore, in one embodiment, PE is able to continue execution of a software thread during texture sampling without a pipeline stall or thread switch.

When the texture sampling unit 109 is done performing a texture sample for the pixel to obtain a textured pixel, which is also referred to as a texel, the texel is provided to the destination address originally provided to texture sampling unit 109. PE 106 may then load the texel from the destination address and perform further processing. Note, that a predefined amount of time may be utilized by PE 106. For instance, PE 106 delegates the texture sampling of a pixel to unit 109, executes independent code for a predefined or predetermined amount of time, and after that amount of time loads from the destination address. Here, the predetermined amount of time includes enough time to ensure texture sampling unit 109 has provided the texel to the destination address.

However, in another embodiment, other amounts of time/periods may be utilized for execution of independent code before loading a texel. For example, the amount of time it takes to complete execution of the independent portion of code is utilized as the amount of time. As another example, when logic 109 has provided the texel to destination address, then it sets a flag to indicate to PE 106 that the computation is complete. As a result, PE 106 either synchronously checks the flag and load the texel, or asynchronously loads the value in response to the flag being set. Either way the amount of time substantially includes the amount of time it takes texture sampling unit 109 to perform the texture sample computation.

Figure 2:
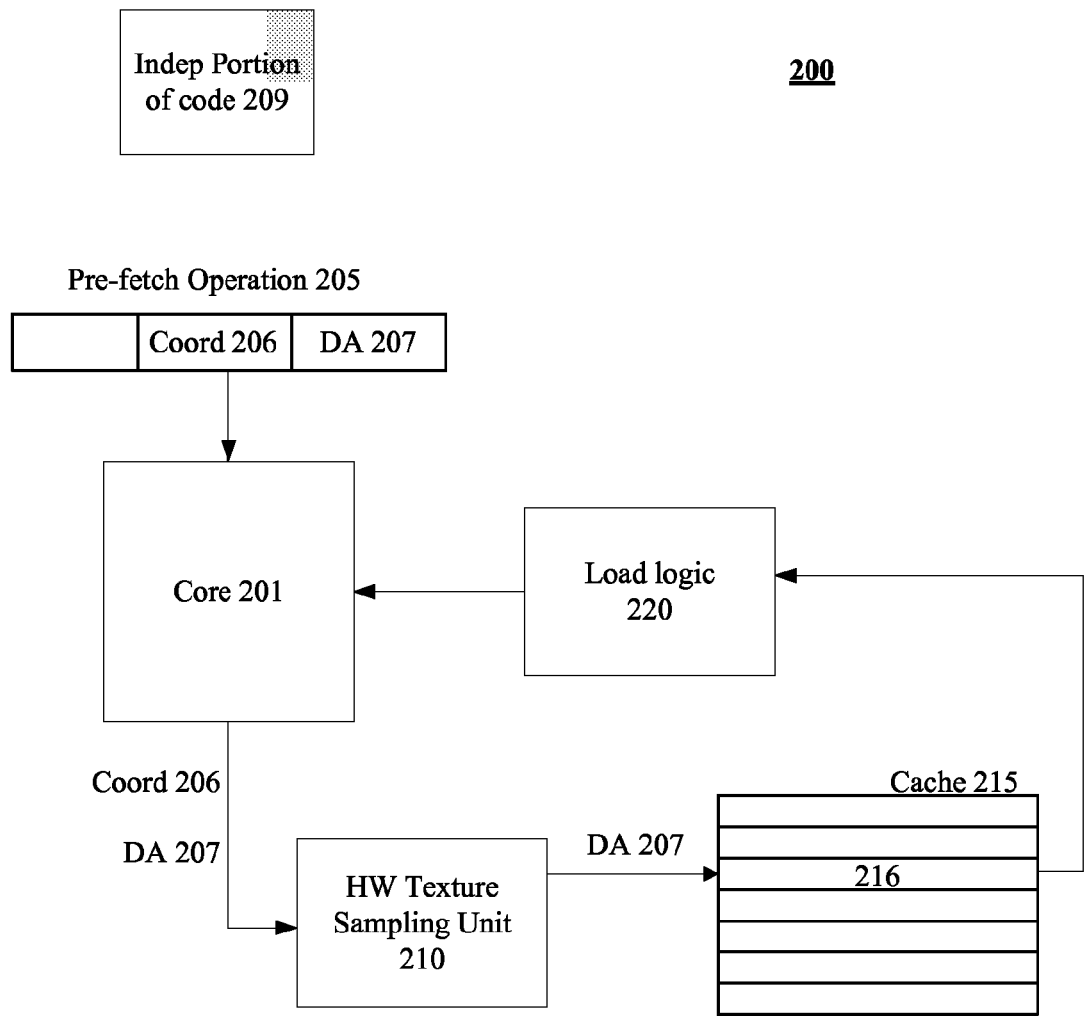
FIG. 2 illustrates an embodiment of hardware to support efficient handling of texture sampling.

Turning to FIG. 2, an embodiment of hardware 200 to support efficient texture sampling is illustrated. In one embodiment, software, such as a compiler, is to compile language based code including texture sampling operations into application code including pre-fetch operations, such as pre-fetch operation 205. Execution of a context or thread on core 201, which includes texture sampling operations, may also be referred to as a software thread. Often, instructions/operations include an identifier field, such as opcode field 208, which is capable of being recognized by hardware. In one embodiment, capable of being recognized by hardware includes the hardware performing operations associated with a value in opcode field 208 that identifies operation 205.

In one embodiment, core 201 in response to executing pre-fetch operation 205 is to delegate texture sampling of a pixel to hardware texture sampling unit 210. As an example, core 201 is to provide texture sample information for a pixel to sampling unit 210. Pixel information may include any information about a pixel or nearby pixels to perform a texture sampling operation. For instance, pre-fetch operation 205 includes coordinate field 206 to reference a coordinate of the pixel to be textured. As a result, core 201 provides coordinate 206 to hardware texture sampling unit.

In one embodiment, pre-fetch operation 205 also references a destination address for a result of the texture sampling for the pixel, which is also referred to as a textured pixel, i.e. a texel. For example, in a processor utilizing address translation, such as virtual memory to linear address translation, a destination address may include a virtual address or a pointer to a virtual address. However, any address of a storage location, such as a memory location, a register location, or other known storage location, may be referenced as a destination address.

In one embodiment, in response to receiving texture sampling information, such as a coordinate of a pixel, hardware texture sampling unit 210 is capable of independently performing texture sampling for the referenced pixel. The result of texture sampling for a pixel is often referred to as a texel, i.e. a textured pixel. In response to a destination address is provided to sampling unit 210, sampling unit provides the result, i.e. the texel, to the destination address. For instance, when the destination address is a virtual address, result is filled into a cache line, such as cache line 216, which is associated with the virtual address. However, the texel may be provided to any storage location referenced by a destination address.

Core 201 is to execute independent code 209, which in one embodiment may be from a software thread including the texture sampling operation to be performed by sampling unit 210, during a period of texture sample computation for a pixel by hardware texture sample unit 210. In other words, core 201 is able to execute other code in parallel to hardware texture sampling unit 210 performing a texture sampling operation.

Independent code refers to any code that does not depend on a texture sample operation delegated to hardware texture sampling unit 210. In one embodiment, the independent code is pre-identified during compilation. For example, a compiler inserts an independent portion of application code including the texture sample operation delegated to unit 210. Note that inserting an independent portion of code may refer to actually inserting code in a position after pre-fetch operation 205 or operations that vector execution to the independent portion of code. Examples of independent code include code from an independent four by four group of pixels not including the pixel, an independent code fiber, and an independent portion of code from the software thread.

The period of texture sample computation for executing independent code may include any period of time or period of instructions to be executed. For example, the period of time may be a predefined or predetermined. To illustrate core 201 executes independent code for a predetermined amount of time, such as 200 ns, i.e. 400 processor cycles for a 2 GHz processor.

As another example, when hardware texture sampling unit 210 completes a texture sample operation, it notifies core 201. Consequently, here, the period of time includes the time from executing pre-fetch operation 205 to the time when hardware texture sampling unit 210 notifies core 201 the texture sample operation is complete. In this example, hardware texture sampling unit 210 may set a flag upon completing a texture sample operation. In yet another embodiment, the period of time is an amount of time for core 201 to complete execution of independent portion of code 209. As an example, a pre-defined amount of time is utilized, i.e. a static latency, which is long enough to tolerate most texture samples.

As stated above, hardware texture sampling unit 210 provides a textured pixel (texel) to destination address 207. Furthermore, where destination address 207 includes a virtual address or a pointer thereto. In one embodiment, the texel is provided to cache line 216 in cache 215, which is associated with the virtual address. Furthermore, in one embodiment, the texel is loaded by core 201 after a period of time, such as the periods of time described above.

Therefore, in an embodiment, after a predetermined amount of time, a normal load operation in software is executed to load the texel from the destination address. However, a load operation may be executed to load from line 216 after any of the periods of time described above. For example, a timer may be utilized to determine a predefined amount of time before the load operation is executed. Alternatively, hardware, such as load logic 220 may perform a load from destination storage logic, such as cache 215, a register, or other storage logic.

Above, purely illustrative examples of amounts of time between pre-fetch texture sampling operations and loading of a texel, destination addresses, and storage logic is described. However, any logic or methods may be utilized for core 201 to delegate texture sampling to unit 210, execute other code in parallel, and then later check a destination location that holds the texture sample result from unit 210.

Figure 3:
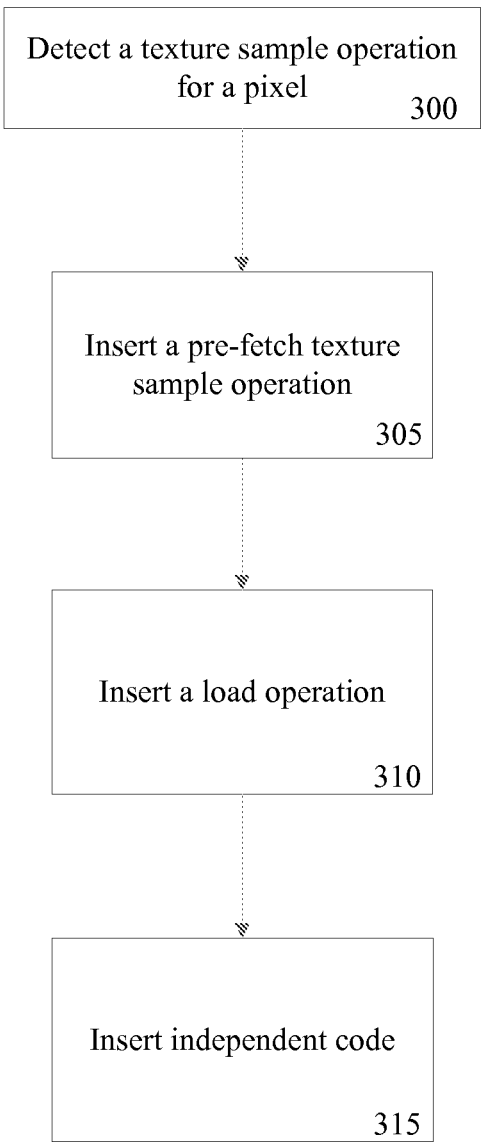
FIG. 3 illustrates an embodiment of a flow diagram for a method of a compiler to efficiently compile a texture sampling operation.
Figure 4:
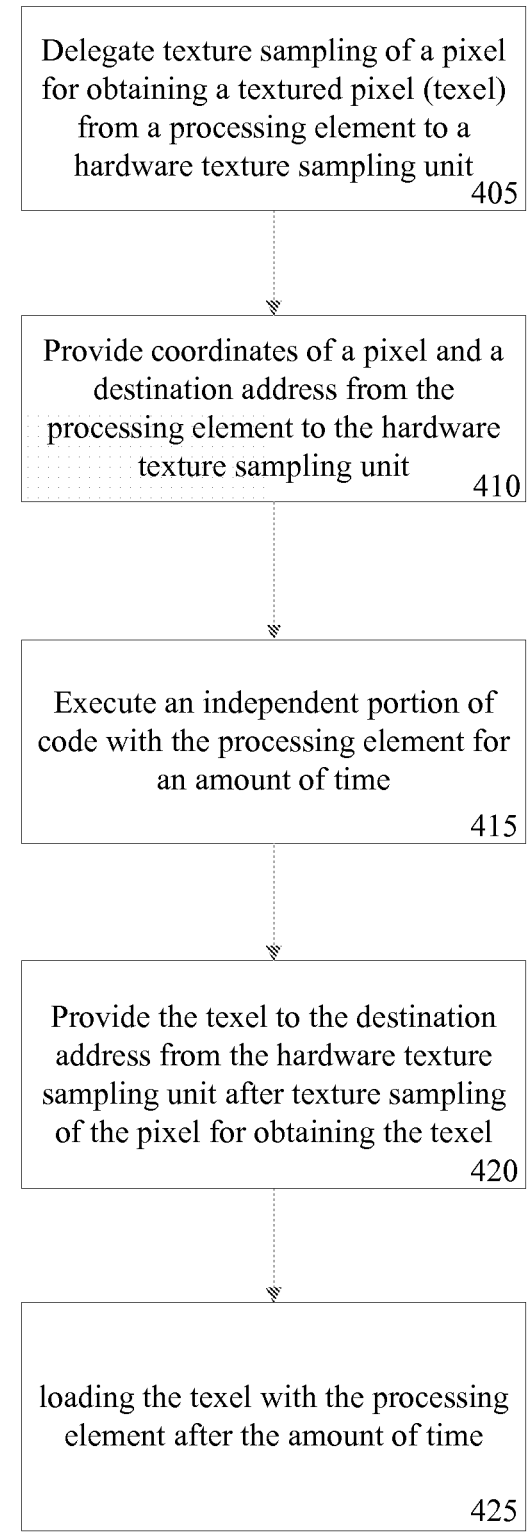
FIG. 4 illustrates an embodiment of a flow diagram for a method of effectively handling a texture sample operation.

Turning FIG. 3 an embodiment of a flow diagram for a method of a compiler to compile texture sample operations is illustrated. Note that the flows in FIGS. 3 and 4 are illustrated in a substantially serial manner. However, any of the flows may be performed either partially or fully in parallel. Furthermore, the order of the flows is purely illustrative, and any flow is potentially performed in a different order.

Often a compiler, when executed, is to compile language based code into binary code executable by an architecture, such as binary x86 code to execute on Intel Architecture (IA). In addition, during compilation, compiler code often inserts operations, functions, calls to functions, and other programming constructs to perform tasks, which may be supported by the specific architecture for the compiled code to execute on. Often when compiling code, the compiler will replace instructions and operations with other operations and instructions to optimize or provide instructions to take advantage of specialized abilities of hardware.

Furthermore, compilers often perform optimizations on code, as well as other compiler tasks. These compilers may utilize any style of analysis, such as dependency graphs, control flows, and other known algorithms or analysis tools to effectively and correctly perform compiler tasks. A few such tasks, as described below, potentially includes identifying texture sampling operations, breaking texture sampling operations into pre-fetch texture sampling operations, and identifying/inserting independent code.

In flow 300 a texture sample operation for a pixel is detected. As stated above, any method for a compiler to determine a texture sample operation may be utilized. For example, in language based code, specific instructions are recognizable by the compiler as texture sampling instructions. In response to detecting a texture sampling operation, in one embodiment, a compiler is to perform operations as discussed in reference to flows 305-315.

In flow 305 a pre-fetch texture sample operation is inserted. In one embodiment, the texture sample operation is compiled into a pre-fetch texture sample operation, i.e. the texture sample operation in the language based code is replaced by the pre-fetch texture sample operation in compiled binary code. In one embodiment, a pre-fetch texture sample, when executed, is to provide texture sample information to a hardware texture sample unit to obtain a textured pixel (texel). As an example, texture sample information includes a coordinate of the pixel and a destination address for the texel. In one embodiment, the destination address includes a virtual address or a pointer to a virtual address.

Furthermore, in response to detecting a texture sample operation, a load operation is also inserted in application code. After the texture sample information is passed to a hardware texture sampling unit, the hardware texture sampling unit is to perform a texture sampling operation to obtain a textured pixel (texel). In one embodiment, a destination address is provided for the result of the sampling operation, i.e. the texel. Therefore, when the hardware texture sampling unit completes the texture sampling operation, the texel is provided to the destination address. Additionally, the load operation, when executed, loads the texel from the destination address. Note, that the load operation may be inserted at a point in the application code, which is to be executed after a period of time, such as the periods of time described above.

In flow 315, independent code is inserted in the application code. Independent code, as described above, includes any code which is independent from a texture sample operation that is compiled into a pre-fetch texture sample operation. In addition, the independent code may be associated with the application code, such as a separate independent portion of the application code. As a specific example, pixels may be processed in blocks, such as 16 pixels, which are organized into a 4×4 square. Therefore, when a current texture sample operation referencing a pixel from a first 4×4 square is being processed by a hardware texture sampling unit, independent code may include beginning processing of another 4×4 square.

The independent code is to be executed after the inserted pre-fetch texture sample operation from flow 305 and before the inserted load operation of flow 310. However, note that inserting independent code may be in any manner of referencing an independent portion of code. For example, a vector operation may be inserted in the compiled version of the application code. The vector operation, when executed, to vector execution to an independent portion of the compiled version of the application code.

Although not illustrated, a compiler may also insert a timer operation in application code, when executed, to start a timer in response to the pre-fetch texture sample operation being executed. In one embodiment, a load operation, as described above in flow 310 is executed in response to the timer expiring, i.e. hitting a predefined limit, such as the 400 execution cycles.

Often, in different architectures, an instruction may include a number of micro-operations, which may potentially be both memory access operations and non-memory access operations. As a result, an operation, as described above, may include any instruction, operation, micro-operation, or other related executable code.

Referring to FIG. 4, an embodiment of efficiently handling a texture sample operation is illustrated. In flow 405, a texture sampling of a pixel for obtaining a textured pixel (texel) is delegated to a hardware texture sampling unit of a processor. As an example, the delegation is performed in response to executing, with a processing element of the processor, a pre-fetch texture sample operation that references the pixel. Note that a compiler, as discussed above, may insert the pre-fetch texture sample operation. In one embodiment, delegating texture sampling to a hardware texture sampling logic includes providing a pixel coordinate and a destination address for the texel, as illustrated in flow 410.

In flow 415, an independent portion of code is executed with the processing element discussed from above, for an amount of time, after delegating texture sampling of the pixel to the hardware texture sampling unit. In other words, the independent portion of code is executed on the processing element in parallel with the hardware texture sampling logic performing texture sampling of the pixel. Examples of the amount of time includes a predefined amount of time, an amount of time to execute the independent portion of code, an amount of time for the hardware texture sampling logic to perform the texture sample of the pixel.

The texel, i.e. the result of the texture sampling by the hardware texture sampling unit, is provided to the destination address from the hardware texture sampling unit in flow 420. In addition, the texel is loaded by the processing element after the amount of time. For example, the amount of time includes a predefined amount of time, an amount of time to execute an independent portion of code, an amount of time for hardware sampling logic to perform a texture sampling operation, and/or an amount of time between executing the pre-fetch texture sampling operation and the load operation. In flow 425, the texel is loaded by the processing element from the destination address provided to the hardware texture sampling logic.

As can be seen from above, texture samples may be efficiently handled utilizing a hybrid software and hardware implementation. Software, such as a compiler, is capable of breaking a texture sample operation into a pre-fetch operation and a use operation. As a result, a processing element is capable of delegating texture sampling to a hardware texture sampling unit. Consequently, the processing element is able to continue execution and forward progress, while the texture sample is performed. At some later point, the processing element may execute the use part of the texture sample operation, i.e. the processing element may load and perform further processing after the texture sample is performed by hardware. As a result, a processing element is able to continue execution while a texture sample is being performed.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory machine readable medium including compiler code, which when executed, is to cause a machine to perform the operations of:
    compiling application code to transform the application code into compiled application code, wherein during the compiling the application code,
        detecting a texture sample operation for a pixel in the application code;
        breaking the texture sample operation in the application code into a pre-fetch texture sample operation and a use operation in the compiled application code, the pre-fetch texture sample operation, when executed, to provide texture sample information to a hardware texture sample unit to obtain a textured pixel (texel) and the use operation, when executed, to use the texel; and
        identifying independent code in the compiled application code, which is independent from the texture sample operation and is to be executed after the pre-fetch texture sample operation and before the use operation.

2. The machine readable medium of claim 1, wherein the texture sample information includes a coordinate of the pixel and a destination address for the texel.

3. The machine readable medium of claim 2, wherein the destination address includes a pointer to a virtual address.

4. The machine readable medium of claim 1, wherein identifying the independent code comprises inserting a vector operation in the compiled application code, the vector operation, when executed, to vector execution to an independent portion of the compiled application code.

5. The machine readable medium of claim 1, wherein the use operation includes a load operation, when executed to load the texel, and wherein the compiler code, when executed, further causes the machine to perform the operations of:
    inserting a timer operation in the compiled application code, the timer operation, when executed, to start a timer in response to the pre-fetch texture sample operation being executed, and wherein the load operation is to be executed in response to the timer expiring.

6. A system comprising:
    a memory to hold code including a pre-fetch texture sampling operation referencing a pixel and an independent portion of the code, the pre-fetch texture sampling operation inserted in the code by a compiler in response to a texture sampling operation of application code compiled by the compiler; and
    a processor including a core and a sampling logic, the core to delegate, to the sampling logic, texture sampling of the pixel to texture the pixel into a textured pixel (texel) in response to execution of the pre-fetch texture sampling operation in the core, wherein the core is to execute the independent portion of the code, in parallel with texture sampling of the pixel by the sampling logic, for a period of time, the independent portion of the code not referencing the pixel, and after the period of time to load and process a result of the texture sampling of the pixel corresponding to the texel responsive to execution by the core of a load operation corresponding to a use operation inserted in the code by the compiler to use the texel, wherein during compilation of the code, the compiler is to detect the texture sampling operation, break the texture sampling operation into the pre-fetch texture sampling operation and the use operation, and identify the independent portion of the code.

7. The system of claim 6, wherein the processor is selected from a group consisting of a media processor, a microprocessor, and a graphics processor.

8. The system of claim 6, wherein the core to delegate texture sampling of the pixel to the sampling logic comprises the core to provide a coordinate of the pixel to the sampling logic.

9. The system of claim 8, wherein the pre-fetch texture sampling operation referencing a pixel comprises the pre-fetch texture operation referencing a coordinate of the pixel, and wherein the pre-fetch texture sampling operation further references a destination address for holding the result of the texture sampling of the pixel.

10. The system of claim 9, wherein the sampling logic is to provide the result of the texture sampling of the pixel to the destination address, and wherein the core is to load the result of the texture sampling of the pixel after the period of time, which is to include a first amount of time.

11. The system of claim 6, wherein the period of time includes a first amount of time.

12. The system of claim 6, wherein the compiler is to break a texture sample operation into the pre-fetch texture sample operation and a use operation in which the texture sampling result is processed.

13. A method comprising:
    delegating texture sampling of a pixel to texture the pixel using the pixel for obtaining a textured pixel (texel) to a hardware texture sampling unit of a processor, including providing coordinates of the pixel and a destination address to the hardware texture sampling unit, in response to executing, with a core of the processor, a pre-fetch texture sample operation that references the pixel; and
    executing an independent portion of code, with the core, for an amount of time, after delegating texture sampling of the pixel to the hardware texture sampling unit, the independent portion of code not referencing the pixel, the texture sampling of the pixel and the execution of the independent portion of code performed in parallel, and thereafter loading the texel and processing the texel with the core to perform a use operation, wherein during compilation of the code, a compiler is to detect a texture sampling operation for the pixel, break the texture sampling operation into the pre-fetch texture sample operation and the use operation, and identify the independent portion of the code.

14. The method of claim 13, further comprising:
providing the texel to the destination address from the hardware texture sampling unit after texture sampling of the pixel for obtaining the texel; and
loading the texel with the core after the amount of time.

15. The method of claim 14, wherein loading the texel with the core after the amount of time is in response to executing a load operation with the core to load from the destination address.

16. The method of claim 13, wherein the amount of time includes a predetermined amount of time.

17. The method of claim 13, wherein the amount of time includes an amount of time to execute the independent portion of code.

18. A processor comprising:
a plurality of cores and a hardware texture sample unit, wherein a first core of the plurality of cores, responsive to a pre-fetch texture sampling operation of a software thread that references a pixel, is to provide texture sample information for the pixel for delegation of a texture sample computation for the pixel to the hardware texture sample unit to cause the hardware texture sample unit to texture the pixel to obtain a textured pixel (texel) using the pixel and to provide the texel to a destination address, wherein the first core is to continue execution of the software thread without a stall or thread switch and in parallel with the texture sample computation, including execution of independent code of the software thread that does not reference the pixel during a period of the texture sample computation and to thereafter execute a fetch operation of the software thread to obtain the texel from the destination address and to perform a use operation on the texel, wherein during compilation of code of the software thread, a compiler is to detect a texture sampling operation for the pixel, break the texture sampling operation into the pre-fetch texture sampling operation and the use operation, and identify the independent code of the software thread.

19. The processor of claim 18, wherein the first core is to provide coordinates of the pixel and the destination address to the hardware texture sample unit.

20. The processor of claim 18, wherein the independent code is code selected from a group consisting of code from an independent four by four group of pixels not including the pixel, an independent code fiber, and an independent portion of code from the software thread.

21. The processor of claim 18, wherein the first core is to load the texel from the destination address in response to a flag being set by the hardware texture sample unit to indicate the texture sample computation for the pixel to obtain the texel is complete.

22. The processor of claim 18, wherein the first core is to load the texel from the destination address in response to execution of the fetch operation from the software thread to load from the destination address.

23. The processor of claim 22, wherein a period of texture sample computation is defined by the software thread as the time between the first core execution of the pre-fetch texture sample operation from the software thread and the first core execution of the load operation from the software thread.

* * * * *